(12) United States Patent
Courvoisier et al.

(10) Patent No.: US 11,059,129 B2
(45) Date of Patent: Jul. 13, 2021

(54) METHOD AND DEVICE FOR LASER MICROMACHINING

(71) Applicant: Centre National de la Recherche Scientifique, Paris (FR)

(72) Inventors: François Courvoisier, Cussey sur l'Ognon (FR); Pierre-Ambroise Lacourt, Besançon (FR); Arnaud Couairon, Gif sur Yvette (FR)

(73) Assignee: Centre National De La Recherche Scientifique-CNRS, Paris (FR)

( * ) Notice: Subject to any disclaimer, the term of this patent is extended or adjusted under 35 U.S.C. 154(b) by 1085 days.

(21) Appl. No.: 15/029,644

(22) PCT Filed: Oct. 16, 2014

(86) PCT No.: PCT/EP2014/072255
§ 371 (c)(1),
(2) Date: Apr. 15, 2016

(87) PCT Pub. No.: WO2015/055779
PCT Pub. Date: Apr. 23, 2015

(65) Prior Publication Data
US 2016/0271727 A1 Sep. 22, 2016

(30) Foreign Application Priority Data

Oct. 17, 2013 (FR) ...................................... 1360131

(51) Int. Cl.
*B23K 26/0622* (2014.01)
*B23K 26/073* (2006.01)
(Continued)

(52) U.S. Cl.
CPC ...... *B23K 26/0622* (2015.10); *B23K 26/0624* (2015.10); *B23K 26/0734* (2013.01);
(Continued)

(58) Field of Classification Search
CPC ............ B23K 2101/40; B23K 2103/50; B23K 2103/52; B23K 26/0622; B23K 26/0624
(Continued)

(56) References Cited

U.S. PATENT DOCUMENTS

| 6,580,054 B1* | 6/2003 | Liu | ...................... B23K 26/032 |
| | | | 219/121.68 |
| 8,642,918 B2* | 2/2014 | Unrath | ............... B23K 26/0613 |
| | | | 219/121.61 |

(Continued)

FOREIGN PATENT DOCUMENTS

| JP | 2004-136358 A | 5/2004 |
| JP | 2006-272384 A | 10/2006 |

OTHER PUBLICATIONS

Japanese to English machine translation of JP 2006272384, Published in 2006.*
(Continued)

*Primary Examiner* — Erin E McGrath
(74) *Attorney, Agent, or Firm* — Osha Bergman Watanabe & Burton LLP

(57) ABSTRACT

The invention, according to an aspect thereof, relates to a device (60) for laser micromachining a sample made of a given material, which includes a focusing module enabling a nondiffracting beam to be generated from a given incident beam, said nondiffracting beam being focused along a focusing cylinder that is oriented generally along the optical axis of the focusing module, means (601) for transmitting at least one first light pulse (11) suitable for generating, after said focusing module focuses in the sample, a plasma of free charges by multiphotonic absorption in a volume of the sample located on the side surface of said focusing cylinder.

17 Claims, 10 Drawing Sheets

(51) Int. Cl.
*B23K 26/40* (2014.01)
*B23K 26/382* (2014.01)
*B23K 26/388* (2014.01)
*B23K 101/40* (2006.01)
*B23K 103/00* (2006.01)

(52) U.S. Cl.
CPC .......... *B23K 26/388* (2013.01); *B23K 26/389* (2015.10); *B23K 26/40* (2013.01); *B23K 2101/40* (2018.08); *B23K 2103/50* (2018.08); *B23K 2103/52* (2018.08)

(58) Field of Classification Search
USPC ..................... 219/121.85, 121.6, 121.61, 219/121.67–121.72
See application file for complete search history.

(56) References Cited

U.S. PATENT DOCUMENTS

| | | |
|---|---|---|
| 2005/0115939 A1 | 6/2005 | Jacobs |
| 2007/0051706 A1* | 3/2007 | Bovatsek ........... B23K 26/0617 219/121.69 |
| 2009/0057279 A1 | 3/2009 | Garry et al. |
| 2010/0025387 A1* | 2/2010 | Arai ......................... B28D 5/00 219/121.69 |

OTHER PUBLICATIONS

Beresna et al., "Polarization sensitive elements fabricated by femtosecond laser nanostructuring of glass," Published Aug. 2011.*
Bhuyan et al., "High aspect ratio nanochannel machining using single shot femtosecond Beassem beams," published Aug. 2010.*
Peng et al., "Optimization of Non-diffractive Beam Propagation in Random Media Formed by Annular Beam," published in 2016.*
Zeng et al., "Modeling of Gaussian-to-annular beam shaping by geometrical optics for optical trepanning," published in 2004.*
International Search Report issued in corresponding application PCT/EP2014/072255 dated Feb. 10, 2015 (4 pages).
Written Opinion issued in corresponding application PCT/EP2014/072255 dated Feb. 10, 2015 (5 pages).

* cited by examiner

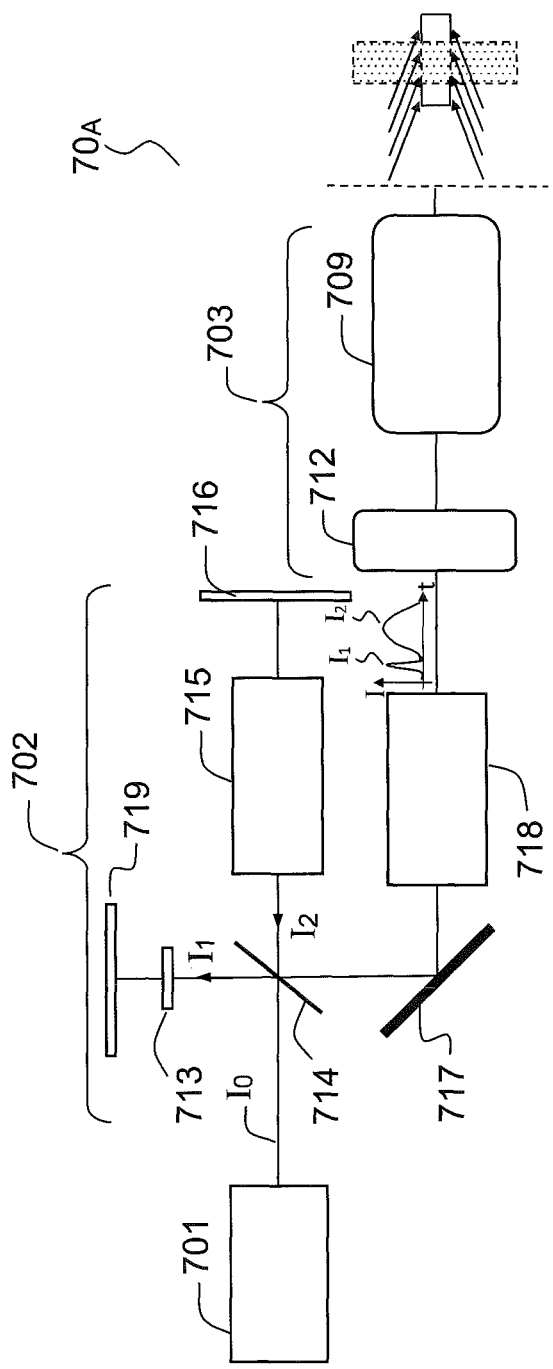
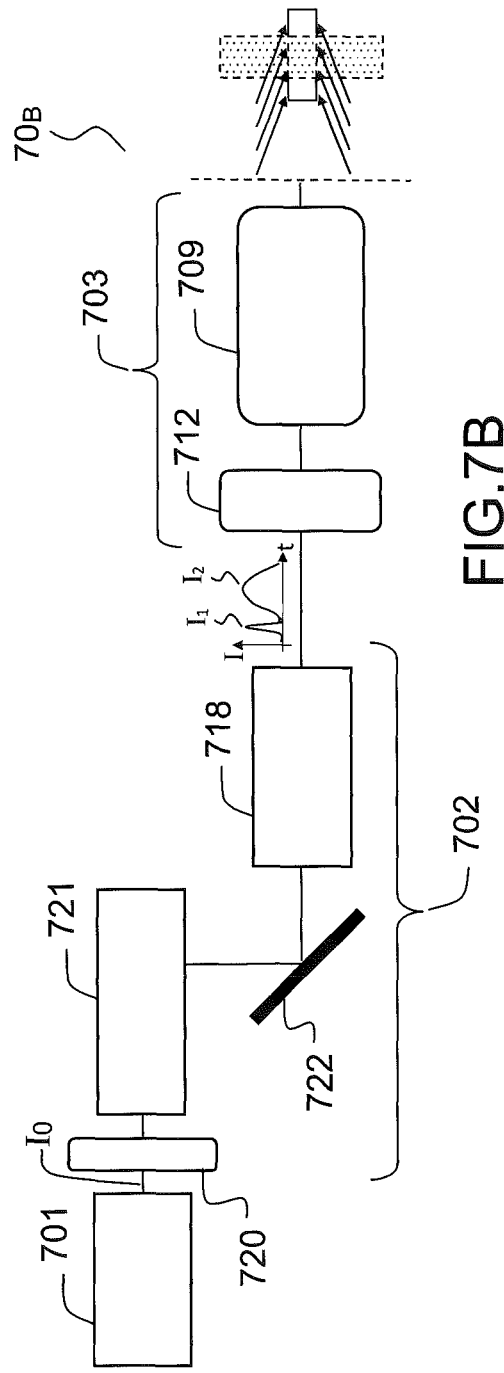
FIG.7A
FIG.7B

METHOD AND DEVICE FOR LASER MICROMACHINING

PRIOR ART

1. Technical Field of the Invention

The present invention relates to a method and a device for high-speed laser micromachining, adapted notably for the micro-drilling of materials for microelectronics.

2. Prior Art

Various techniques are known for drilling channels or "vias" in or through semiconductor wafers for micro- and nanoelectronics and for photovoltaics.

These drilling techniques comprise for example the focusing of beams of ions (process referred to as "ebeam") or photolithography followed by deep reactive ion etching (or DRIE). Ebeam technology, which requires a high vacuum, is adapted to holes with diameters of less than 100 nm and is slow to machine. Photolithographic technology requires the prior formation of a mask; it is therefore not very flexible and costly.

In the field of the micro-/nano-structuring of dielectric materials (for example glass), the inventors have shown that the use of a femtosecond laser beam with a "non-diffracting" spatial profile of the Bessel beam type gives access to the control of the deposition of energy within the depth of the material. This technology notably allows a micro-explosion to be created that is sufficiently intense and localized to evacuate the material to be ablated (see for example M. K. Bhuyan et al., "High aspect ratio nanochannel machining using single shot femtosecond Bessel beams", Appl. Phys. Lett. 97, 081102 (2010)). Thus, a single laser pulse allows a nano-hole to be created with a very high aspect ratio (nano-canal). This technique is however limited to holes with diameters of less than a few hundred nanometers.

The subject of the invention is to provide a micromachining device and method for the high-speed drilling of through-holes with large diameters (greater than a micron), notably applicable to the micromachining of transparent materials in microelectronics.

SUMMARY OF THE INVENTION

According to a first aspect, the invention relates to a device for laser micromachining of a sample made of a given material, comprising:

- a focusing module allowing the generation, starting from a given incident beam, of a non-diffracting beam focused according to a focusing cylinder generally oriented along the optical axis of the focusing module;
- means for emission of at least one first light pulse ($I_1$) designed to generate, after focusing by said focusing module in the sample, a plasma of free charges by multi-photonic absorption within a volume of the sample situated on the lateral surface of said focusing cylinder.

By choosing the emission means such that the first light pulse has a spectral band included in the band of transparency of the material that it is desired to machine, the linear absorption in the material is limited, thus allowing the material to be machined in depth by virtue of a process initiated by the non-linear multi-photonic absorption within the sample.

The band of transparency of the material is defined as the spectral range in which the coefficient of absorption of the medium is less than a given value, for example 0.5 cm$^{-1}$, corresponding to a transmission of the medium greater than 60% for a medium of thickness 1 cm. The spectral band of transparency is thus for example the spectral band beyond 1100 nm for a sample made of a semiconductor material of the silicon type. It covers the whole of the visible and infrared spectrum for a dielectric material such as glass. In other words, the spectral band of the first light pulse is chosen so that the electronic transition can only be effected by an optical transition with at least two photons.

The applicants have shown that the device according to the first aspect notably allows, thanks to the generation of a non-diffracting beam focused according to a focusing cylinder, the machining of the sample so as to form large diameter holes, typically larger than a micron, while at the same time avoiding the phenomena of hot spots and of multiple filamentation which could result from the propagation of a simple annular diffracting beam.

Such a non-diffracting beam is advantageously a beam having, in the space of the spatial frequencies $k_r$, an annular intensity distribution and a phase of the type $\Phi(k_r, \theta)=N\theta$, referred to as a "Vortex phase", where ($k_r$, $\theta$) are the cylindrical coordinates and N is a relative non-zero integer called topological charge of the vortex.

Advantageously, in the space of the spatial frequencies $k_r$, the intensity distribution exhibits an intensity maximum for a non-zero spatial frequency $k_{r0}$ and a negligible intensity (in other words less than or equal to a twentieth of the maximum intensity) for spatial frequencies included between $k_r=0$ and $k_r=k_{r0}/5$.

According to one variant, such a non-diffracting beam, called a Bessel-Vortex beam, in the focusing area of the focusing module and close to the optical axis, has a light intensity I(r) that may be approximately described by the radial profile $I(r)=|J_N(k_0 r \sin \gamma)|^2$, where r is the radial coordinate, $J_N$ is the function corresponding to the Bessel function of order N of the first kind and N is the topological charge of the vortex, $k_0$ is the wave vector at the central wavelength of the laser $\lambda_0$, $\gamma$ is called the conical angle of the beam. The choice of the parameters of the Bessel-Vortex beam allows the geometry of the focusing cylinder to be adjusted.

According to one variant, a Bessel-Vortex beam is obtained starting from an incident laser beam by making it pass successively through a vortex phase plate applying the spatial phase $\Phi(r, \theta)=N\theta$, then a lens of the axicon type. Advantageously, the incident laser beam has a light intensity that is substantially constant over the region of application of the phase, for example a Gaussian intensity profile. Alternatively, a Bessel-Vortex beam may be obtained from a laser beam by transmission or reflection on a phase plate or a spatial phase modulator.

According to one variant, the focusing module allows the formation of several non-diffracting beams in parallel so as to form a plurality of focusing cylinders in the sample.

The emission means comprise for example a pulsed laser source allowing the emission of first light pulses with a duration of less than 100 picoseconds or of trains of first light pulses.

According to one variant, the optical power of a first light pulse or of a train of first light pulses is higher than a first optical power threshold sufficient for causing a modification of the physico-chemical properties of the material at the location of formation of the plasma and/or inside the focusing cylinder and/or outside the focusing cylinder.

According to one variant, the optical power is higher than a second optical power threshold sufficient for causing ablation of the material at the location of formation of the plasma.

In one or the other of these cases, the machining of the material may be carried out by means of single laser pulses or by means of a train of pulses.

According to one variant, the emission means allow the emission of at least a second electromagnetic wave intended to be spatially superposed at the location of formation of the plasma generated by the first light pulses.

The applicants have shown that the non-linear effects, and notably the Kerr effects, responsible for non-uniformity in the formation of the plasma could indeed be limited by the time-domain conditioning of the pulses incident in the sample in the form of two time-shifted pulses. Thus, the first ultra-short light pulse, with a duration of less than or equal to 100 picoseconds and advantageously with a duration of less than or equal to 10 picoseconds, allows, after focusing in the sample by means of the focusing module, the formation of the plasma of free charges by multi-photonic absorption. The second electromagnetic wave or waves, the light intensity of which is less than that of the first pulse, allow the energy to be deposited that enables the modification of the physico-chemical properties, or even the ablation, of the material.

According to one variant, the first and second pulses are sufficiently close together in time for the second pulse to allow a heating up of the material by absorption by the free charges of the plasma (first and second pulses separated by a time shorter than the lifetime of the plasma, typically 1 to 10 ps depending on the material).

According to another variant, the laser pulses are separated by a period of time longer than the lifetime of the plasma but shorter than the thermal relaxation time (typically 1 to 100 ns, depending on the material).

According to one variant, said second electromagnetic wave or waves may be microwaves or terahertz waves, the wavelength of these waves being included within the range of transparency of the material that it is sought to machine in order to avoid any linear absorption. Alternatively, said second electromagnetic wave or waves are light waves with a wavelength also included within the range of transparency of the material, emitted in the form of single pulses, for example with a duration in the range between a few fractions of picoseconds and a few milliseconds or in the form of a train of pulses.

For the formation of said first and second light pulses, according to one variant, it is possible to use two separate synchronized laser sources.

Alternatively, said first and second emission means are formed by a single source for emission of a laser pulse and comprise a time-domain conditioning module allowing the generation, starting from the light wave emitted by said laser source, of the first and second light pulses.

Advantageously, the device according to the first aspect furthermore comprises a scanning module allowing the relative movement between the non-diffracting beam and the sample.

According to one variant, the device furthermore comprises a module for conditioning the polarization of the pulses emitted by the emission means.

According to one variant, the device furthermore comprises means for evacuating the material contained inside the focusing cylinder.

According to a second aspect, the invention relates to a method for laser micromachining of a sample made of a material exhibiting a given transparency band, where the method may be applied to the micro-drilling, or more generally, to the inducing of stresses into the material, for example for cleaving.

The method according to the first aspect comprises:
the emission of at least a first pulse with a spectral band included within the transparency band of said material;
the spatial conditioning of said first pulse allowing, after focusing in said sample, a non-diffracting beam focused according to a focusing cylinder to be formed, the light intensity of said non-diffracting beam allowing a plasma of free charges to be generated by multi-photonic absorption within a volume of the sample situated on the lateral surface of said focusing cylinder.

According to one variant, the method comprises the emission of a first light pulse or of a train of first light pulses with a sufficient optical power to cause a modification of the physico-chemical properties of the material at the location of formation of the plasma and/or inside the focusing cylinder and/or outside the focusing cylinder. According to one variant, the optical power is sufficient to cause the ablation of the material at the location of formation of the plasma.

According to one variant, the method comprises the emission of at least a second electromagnetic wave with a spectral band included within the transparency band of said material, spatially superposed at the location of formation of the plasma.

According to one variant, the spatial conditioning of said first pulse comprises a spatial modulation of the amplitude of said pulse in order to render the light intensity of said first pulse substantially constant on the focusing cylinder.

The method thus described offers numerous applications.

For example, the method according to the second aspect can be applied to the micro-drilling of a sample made of a given material for the formation of at least one through-hole.

The method then comprises, depending on the variants:
the control of the diameter of the through-hole by the control of the parameters for spatial conditioning of the first light pulse, and/or
the control of the relative position of the sample and of the non-diffracting beam, and/or
the superposition of concentric Bessel-Vortex beams and of different topological charges.

According to one variant, the method furthermore comprises the evacuation of the material contained inside the focusing cylinder in order to form said through-hole, for example by chemical, ultrasonic or mechanical means (e.g. jet of air or liquid).

The method according to the second aspect may also be applied, according to one variant, to the cleaving of a sample by inducing a stressed region within the material.

The method according to the second aspect may also be applied, according to one variant, to the drilling of holes with a very large diameter (typically greater than a few tens of microns) by "milling". In this case, the method comprises for example the displacement of the focusing cylinder around the area to be removed.

The method described in the present application is applicable to dielectric materials, for example glasses, fused silica, quartz, lithium niobate, diamond, and also to semiconductor materials.

BRIEF DESCRIPTION OF THE DRAWINGS

Other advantages and features of the invention will become apparent upon reading the description, illustrated by the following figures:

FIGS. 7A, 7B, diagrams showing two devices according to the present description, with particular examples of time-domain conditioning modules;

DETAILED DESCRIPTION

Figure 1:
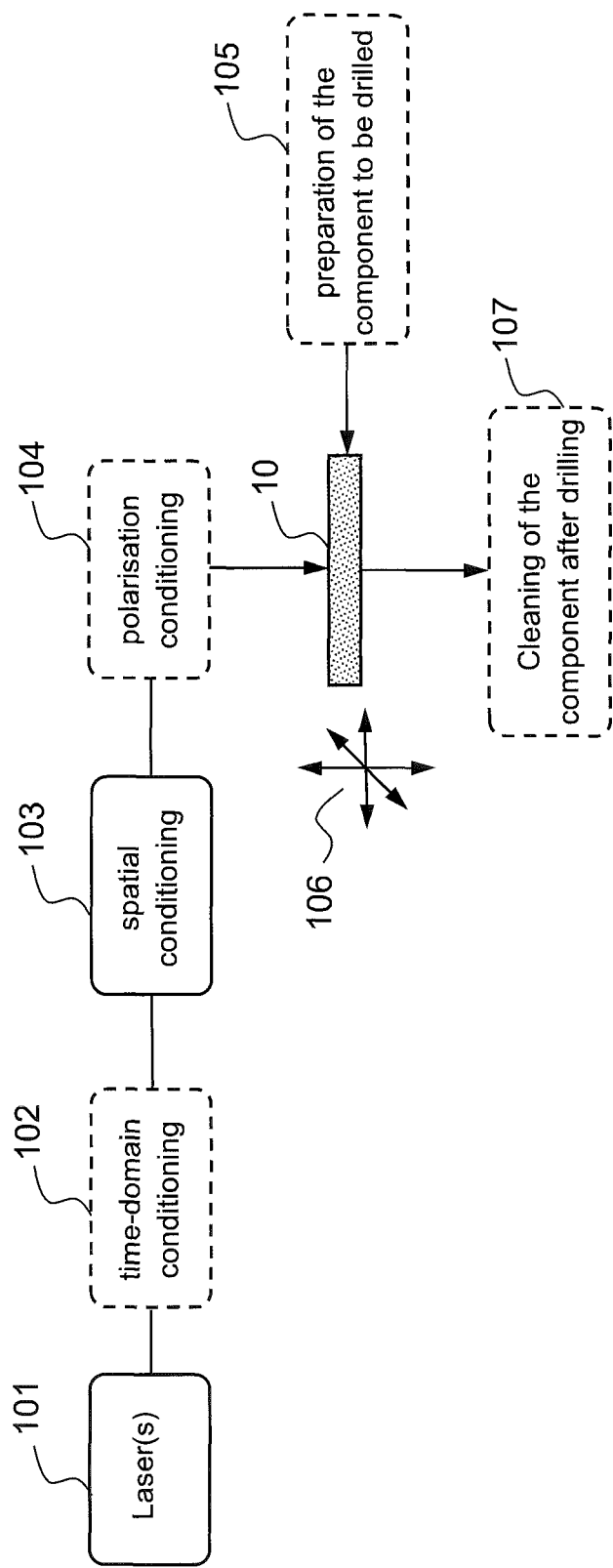
FIG. 1, a diagram illustrating the micromachining method according to the invention according to one example.

FIG. 1 illustrates, with a diagram, a first example of a micromachining method according to the present description, applied to drilling into a sample.

According to this example, the micromachining method comprises an emission 101 of a beam by a pulsed laser source, and the focusing of the beam onto a sample 10 to be drilled, after a time-domain conditioning step 102 (optional), a spatial conditioning step 103 and a polarization conditioning step 104 (optional) which will be described in more detail hereinbelow. The scanning of the beam and the translation/rotation (symbolized by the arrows 106) of the sample can allow a relative movement between the beam and the sample in order to carry out several drillings sequentially on the same sample. According to one variant, as will be described in more detail hereinafter, the component to be drilled may be prepared prior to the drilling operation (step 105) and a step for cleaning the component after drilling (step 107) may also be carried out in order to eliminate the ablated material.

The spatial conditioning 103 of the incident beam allows a non-diffracting beam to be formed after focusing, thus foaming a focusing cylinder in the sample, in other words a beam having the property of maintaining a constant profile along the axis of propagation on a focusing cylinder of given dimensions, hence the description "non-diffracting". Such a beam exhibits a maximum of light intensity on the surface of the focusing cylinder.

A non-diffracting beam according to the present description, generally speaking, has an annular intensity distribution in the domain of the spatial frequencies with an intensity maximum for a non-zero spatial frequency $k_{r0}$ and a negligible intensity, typically less than or equal to a twentieth of the maximum intensity, for spatial frequencies in the range around the spatial frequency zero, for example between $k_r=0$ and $k_r=k_{r0}/5$. It furthermore exhibits a spectral or spatial phase of the type $\Phi(r, \theta)=N\theta$, where $(r, \theta)$ are the cylindrical coordinates, and N, a relative non-zero integer, called topological charge of the vortex.

Figure 2:
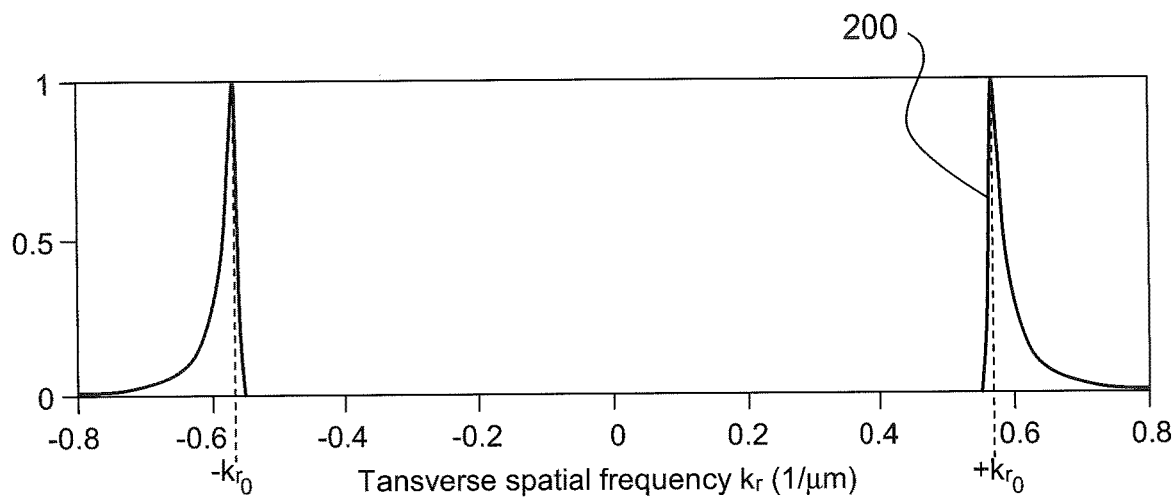
FIG. 2, a curve showing the distribution of the spatial frequencies of a Bessel-Vortex beam according to one example.

FIG. 2 thus shows one example of an intensity distribution 200 in the domain of the spatial frequencies. In this space $(k_x, k_y)$, the distribution may be annular, with a radial profile $(I(k_r))$ having a Gaussian shape centered on $$k_{r0} = \frac{2\pi}{\lambda_0}\sin\gamma,$$

or a more peaked distribution, as is illustrated in FIG. 2. Such a distribution generates a beam with a conical angle $\gamma$ at the central wavelength of the laser $\lambda_0$. Such non-diffracting beams are for example described in V. Jarutis et al. ("Focusing of Laguerre-Gaussian beams by axicon", Optics Communication 184 (2000) 105-112).

Figure 4A:
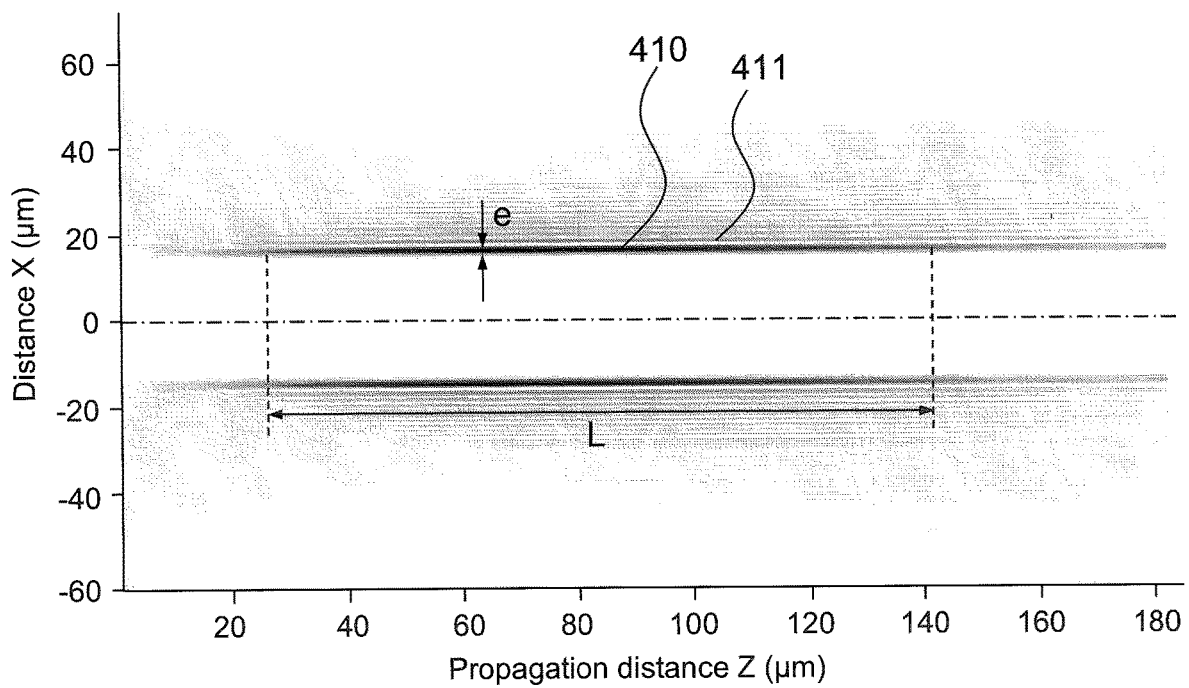
FIGS. 4A and 4B, images showing the spatial distribution of a Bessel-Vortex beam, according to a longitudinal profile (4A) and a transverse profile (4B), in a first exemplary embodiment.
Figure 3:
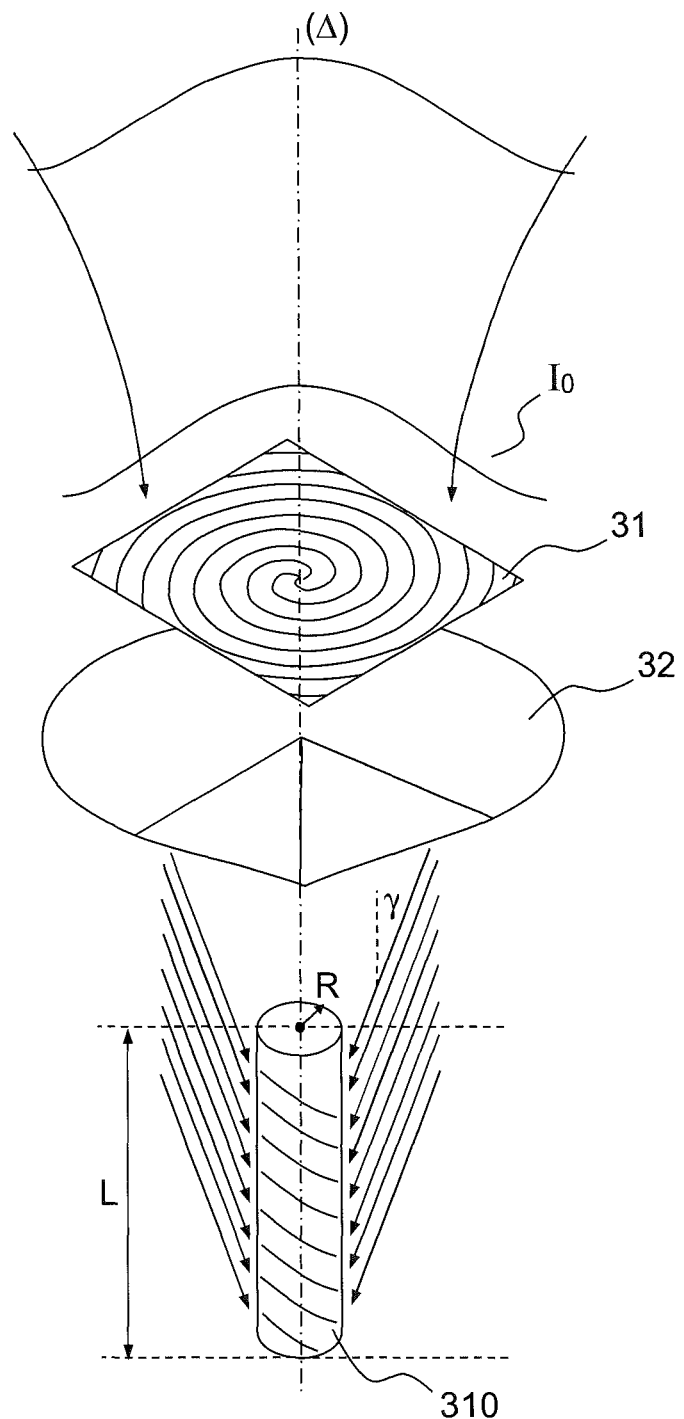
FIG. 3, a diagram illustrating the generation of a Bessel-Vortex beam starting from a Gaussian beam, according to one exemplary embodiment.
Figure 4B:
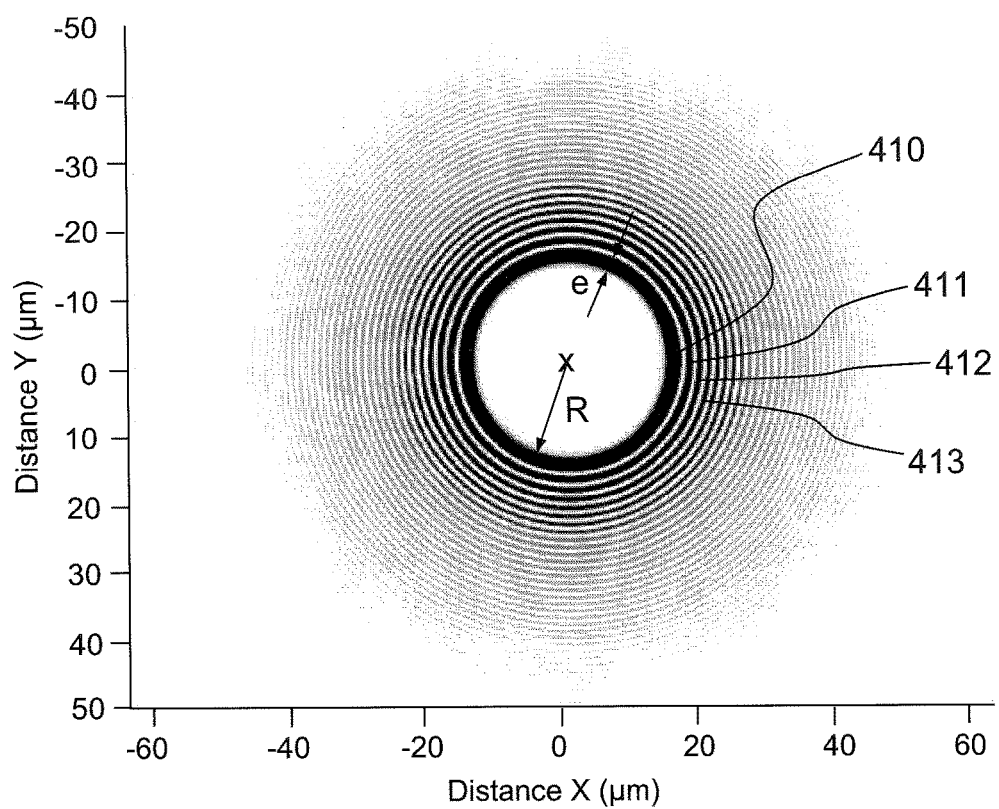

FIG. 3 illustrates, according to one example, a method for generating a beam of the Bessel-Vortex type starting from an incident beam $I_0$, for example a Gaussian beam or a "top hat" beam with an intensity profile that is flat over a disk of given radius, and FIGS. 4A and 4B illustrate, according to a first example, the spatial distribution of intensity of a beam of the Bessel-Vortex type propagating along an axis Z, respectively across a longitudinal cross-section (X, Z) and across a transverse cross-section (X, Y) of the beam.

In the example illustrated in FIG. 3, an incident beam $I_0$ passes through a phase plate 31 called "vortex phase plate" allowing a phase $\Phi(r, \theta)=N\theta$ to be applied, then through an optical system 32 of the axicon type, or, more generally, any type of element allowing a spatial phase of the type $\Phi(r)=\beta r$ (in cylindrical coordinates) to be applied in order to obtain an annular intensity distribution shown schematically in FIG. 3 by the cylinder 310. As is illustrated in FIGS. 4A and 4B, the intensity distribution of the beam thus obtained has an intensity of zero along the axis of propagation and an intensity distribution with a maximum on an annular region 410. Around this main lobe, secondary lobes (411-413) have a lower intensity. The beam is notably characterized by the propagation length L, a radius R of the central dark region (in other words the radius of the focusing cylinder 310) and a thickness e of the main lobe. The propagation length L is for example defined as the length of the focusing cylinder for which the light intensity remains higher than or equal to half of the maximum light intensity. Along the propagation, the annular region of maximum intensity hardly varies, such that by defining the aspect ratio of the non-diffracting beam obtained as the ratio between the propagation length and the thickness at half-height of the main lobe 410, the aspect ratio is greater than or equal to 5. The characteristics of the Bessel-Vortex beam can be independently adjusted by choosing the parameters of the elements allowing the generation of the Bessel-Vortex beam, and notably the topological charge N of the vortex, the "waist" of the Gaussian beam incident on the conditioning system (where the waist is defined by the radius of the beam for which the intensity is equal to $I_{max}/e^2$, where $I_{max}$ is the maximum light intensity), and the conical angle $\gamma$ of the Bessel beams. For example, by increasing the topological charge N, the diameter of the focusing cylinder is increased. The thickness of the main lobe of the focusing cylinder decreases when the conical angle γ increases or, in an equivalent manner, when the peak intensity in Fourier space moves toward higher values of $k_r$. When the waist of the initial Gaussian beam is increased, or in an equivalent manner, when the width of the initial intensity distribution is increased, the propagation length L increases.

According to one variant, a single spatial conditioning element will be able to be used for applying the annular conditioning and the vortex conditioning.

Bessel-Vortex beams possess several special features used to advantage in the device and the method according to the present description.

The non-linear propagation in the material of non-diffracting beams, and notably beams of the Bessel-Vortex type, is quasi-stationary. This means that, even at high intensity, these beams are subject to very little deformation in the spatial and time domains. This is in strong contrast to the propagation of Gaussian beams, which are deformed at high intensity owing to the Kerr effect (self-focusing) and to the interaction with the plasma of free electrons generated by the laser pulse in the material.

Advantageously, the applicants have shown that an excellent stationarity of beams of the Bessel-Vortex type is obtained for a sufficiently large conical angle, preferably greater than around 10°.

Figure 5:
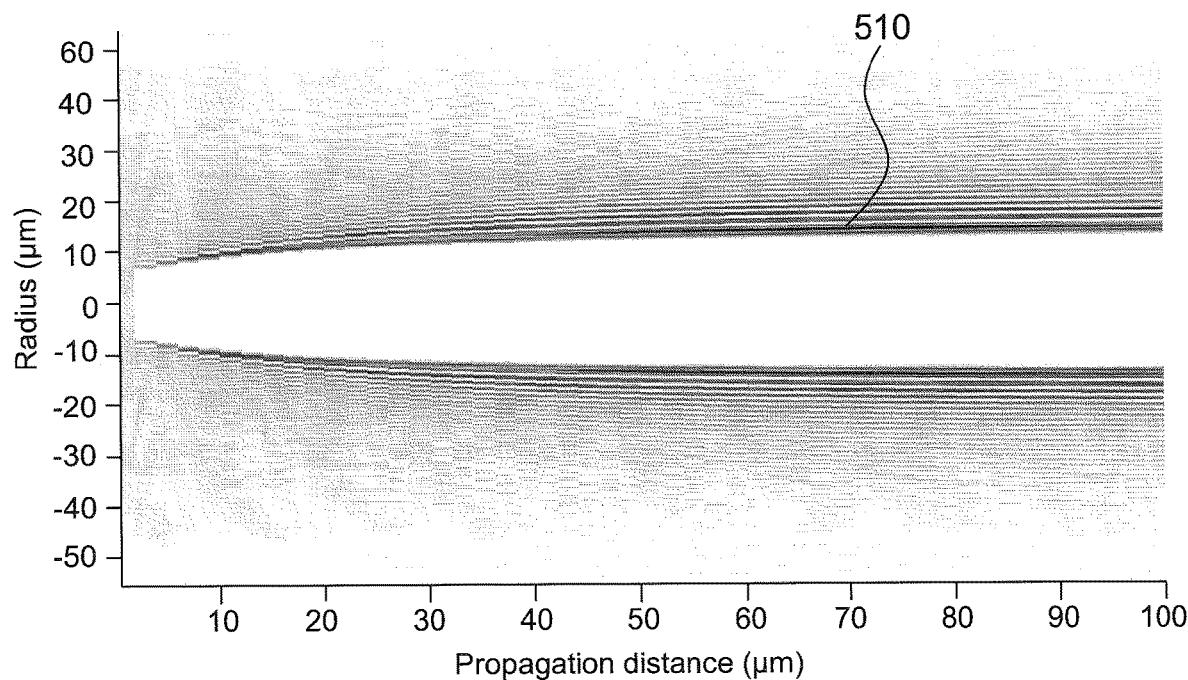
FIG. 5, an image showing the spatial distribution of a Bessel-Vortex beam, according to a longitudinal profile, in a second exemplary embodiment.

Lastly, variants of the beams of the Bessel-Vortex type may be formed by applying a slight additional deformation to the wavefront. For example, the diameter of the central 'dark' region may decrease or increase along the propagation, while at the same time maintaining the property of non-linear quasi-stationarity of the beam, as is illustrated in FIG. 5. This deformation may be achieved by simple longitudinal misalignment of focusing optics in an afocal system. This deformation can also be obtained by the addition of a quadratic term of the type $\Phi = ar^2$ on a mask or a phase plate.

Thanks to the spatial conditioning of the pulses implemented in the present description, it is thus possible, with very high light intensities (for example using femtosecond pulses), to cause a nano-explosion within the material by means of a single laser pulse, and to generate a cylindrical hollow. The material is thus only vaporized on the lateral surface of the cylinder. The material remaining inside this cylinder may be evacuated by the force of gravity or by using other methods, for example by an ultrasound cleaning.

It is also possible to work under the ablation threshold; the material then undergoes a modification of its physical and/or chemical properties due to the laser pulse, then a step for selective chemical attack (for example by the hydrofluoric acid or potassium hydroxide for the case of silica glasses) allows the ablation per se to be generated.

Thus, the drilling of channels with dimensions of the order of a few tens of micrometers in diameter over a few tens of micrometers in depth is achievable by means of a single laser pulse, which renders the technique extremely attractive in terms of speed of execution.

According to one variant shown in FIG. 1, a time-domain conditioning step 102 allows, using a single laser source, a first and a second light pulse to be generated with spectral bands included within the band of transparency of the material from which the sample is formed. The first pulse is of short duration, for example less than 100 picoseconds, advantageously less than 10 picoseconds and preferably of the order of a few fractions of a picosecond, and allows the formation of a plasma of free charges at the location of the focusing cylinder, by multi-photonic absorption. The second pulse, which is longer or even continuous, allows the major part of the energy to be deposited allowing the laser ablation. The second pulse may be synchronized with the first in order to allow the excitation produced by the first pulse to still be active at the time of the arrival of the second pulse (typically, this excitation lasts between 0.1 and 5 picoseconds, depending on the materials). In the case where its intensity is sufficient, the second pulse can also amplify the plasma density effect by an ionization avalanche effect. The second pulse may be produced during the lifetime of the plasma in such a manner as to excite the free charges of the plasma and to contribute to the heating up of the material. The second pulse may also be produced after a longer period of time, but shorter than the thermal relaxation time, i.e. typically less than 100 ns.

The time-domain conditioning of the incident beam in the form of two pulses with suitable durations and wavelength thus allows an excitation at low energy to be carried out and the non-linear effects during the propagation in the material to be minimized accordingly, then the density of energy necessary for the heating up of the material to be deposited for causing it damage or its ablation by virtue of the second pulse of longer duration.

As an alternative to the use of a single laser source and of a time-domain conditioning module, two separate laser sources may be used for generating the first and second pulses. Furthermore, the deposition of energy can be carried out by means of an electromagnetic wave which is not a light wave, for example a wave of the microwave or terahertz wave type, as long as the spectral band of the electromagnetic wave is included within the range of transparency of the material and can be absorbed by the free charges of the plasma formed by the first pulse. Alternatively, the deposition of energy may be effected by a train of short rapid pulses.

Figure 6:
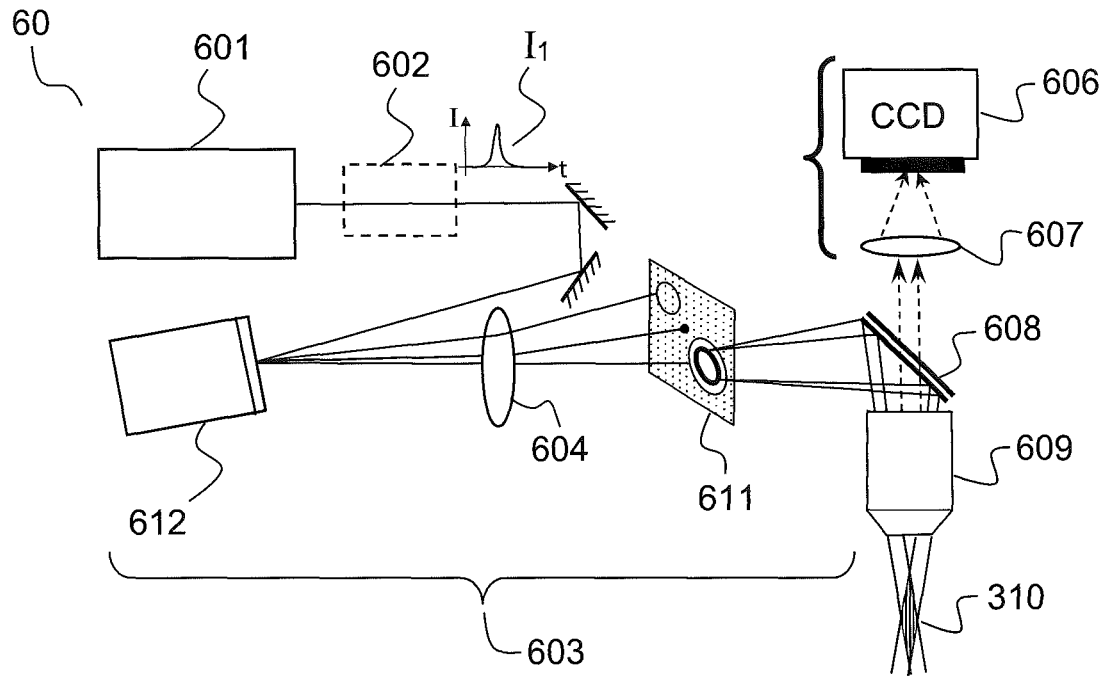
FIG. 6, a diagram showing a device according to the present description with one example of a spatial conditioning module.

FIG. 6 illustrates, according to one exemplary embodiment, a micromachining device 60 according to the present description, and more particularly shows one example of a focusing module.

The device 60 comprises, in this example, a laser source 601 adapted to the emission of ultra-short first pulses, denoted $I_1$. Optionally, a time-domain conditioning module 602 can allow first and second light pulses to be generated, as has been previously described and will be detailed in the following.

The device furthermore comprises a focusing module 603 for the spatial conditioning of the pulses in the sample, allowing, starting from a given incident beam, a non-diffracting beam 310 to be generated in the sample according to a focusing cylinder. The non-diffracting beam is for example of the Bessel-vortex type. The focusing cylinder is generally oriented along an optical axis of the focusing module. In the case of two light pulses formed by the time-domain conditioning module, the two pulses advantageously pass through the same module 603, which allows the spatial superposition of the pulses in the sample to be facilitated.

In the example in FIG. 6, the focusing module 603 comprises an optical system 612 designed to generate the non-diffracting beam for example of the Bessel-Vortex type such as previously described, then an imaging system (604, 609) for the reduction of the size of the beam in the sample.

As previously explained, the spatial conditioning of the beam comprises two aspects. On the one hand, it aims to create an annular intensity distribution in the domain of the spatial frequencies, and on the other hand, to apply a phase of the vortex type to the beam(s). These two conditioning functions may be carried out independently or conjointly by the same optical element.

The optical elements allowing the conditioning of the vortex type to be carried out are for example a phase hologram in reflection or in transmission mode, an intensity hologram (in particular binary) in reflection or in transmission mode, a spatial phase modulator, a glass plate in which a distribution of anisotropy is photo-inscribed (see for example M. Beresna et al. "Polarization sensitive elements fabricated by femtosecond laser nanostructuring of glass", Optical Material Express Vol. 1 N° 4 (2011)).

In order to form an annular intensity distribution, the elements described hereinabove can all be used for applying a spatial phase of the type $\Phi(r)=\beta r$ (in cylindrical coordinates). For the same purpose, it is furthermore possible to use an axicon, or a mirror with a hole in its center. Advantageously, a single spatial conditioning element will be used for applying the annular conditioning and the vortex conditioning.

Furthermore, it is advantageous to be able to form these beams, with identical or slightly different characteristics, in parallel. This may be achieved by virtue of matrices of holographic structures, or of matrices of micro-axicons in particular.

According to one variant, the device 60 may furthermore comprise a module for conditioning the polarization of the non-diffracting beam. In particular, circular polarization allows uniform damage to be obtained irrespective of the point of the beam. Benefits in terms of ionization efficiency may also be gained from a radial or ortho-radial polarization.

The imaging system is for example a system of the "telescopic" or "4f" type, in order not to introduce any quadratic phase distortion, and comprises for example an optical element 604 and a microscope lens 609. In the example in FIG. 6, the microscope lens 609 allows the size of the beams in the sample to be greatly reduced. Advantageously, the microscope lens also enables an image of the sample to be machined to be formed on a camera 606 in front of which a focusing lens 607 is arranged in order to identify the area of the sample that it is desired to machine and ensure the correct positioning with respect to the beam.

In the example in FIG. 6, a spatial filter 611 positioned in the focal plane of the optical element 604 allows the spatial filtering of the diffraction figures formed by the optical system 612 so as to select only the spatial frequencies corresponding to the non-diffracting beam of interest.

According to one variant, the spatial conditioning may comprise amplitude modulation allowing the intensity of the beams on the axis of propagation to be adjusted, in particular so as to render it as uniform as possible. This amplitude modulation may be achieved either by a specific modulation system of the focusing module, for example a matrix of mirrors or a phase modulator, or it may be integrated into the existing modulation system when such a modulation system is already used to form the non-diffracting beam. In this case, a part of the energy may be diverted toward a diffraction order that will be spatially filtered, for example by means of the spatial filter 611 described in FIG. 6.

In order to reduce the time for moving between one ablation site and another, it may be advantageous to use a displacement system for the laser beam, such as a system of the galvanometrical mirrors type 608 or a system of rotating plates with non-parallel faces.

FIGS. 7A, 7B illustrate two exemplary embodiments of a time-domain conditioning module in examples $70_A$ and $70_B$ of a micromachining device according to the invention, aiming to form first and second light pulses such as previously described.

Each of the devices $70_A$ and $70_B$ comprises a laser source 701 and a time-domain conditioning module 702 allowing said first and second light pulses $I_1$ and $I_2$ to be generated. The device furthermore comprises a focusing module 703 for the spatial conditioning of the beam allowing the generation, starting from a given incident beam, of a non-diffracting beam 310, for example of the Bessel-vortex type, such as has been previously described. For example, the focusing module comprises an optical system 712 designed to generate the non-diffracting beam and an optical block 709, comprising a telescope, for the beam reduction and a set of mirrors for the deflection and the scanning. In the examples in FIGS. 7A and 7B, a frequency conversion module 718 allows the wavelength of the pulses to be adapted to the band of transparency of the material to be machined. For the case of silicon for example, a wavelength of 1550 nm will preferably be chosen. An ultra-short beam at this wavelength may be obtained for example by means of a laser 701 centered at 800 nm (for example using Titanium:Sapphire technology) or 1030 nm to 1064 nm (for example using Ytterbium technology), using fibered technology or otherwise, injected into the frequency conversion system 718, where the latter may be an optical parametric amplifier (OPA) or an optical parametric oscillator (OPO). The frequency conversion module may be arranged downstream of the time-domain conditioning module 702, the time-domain conditioning being more easily implemented at shorter wavelengths.

FIG. 7A illustrates a first example of a time-domain conditioning module 702. In this example, a pulse $I_0$ emitted by the laser source 701 is divided into two by means of a beam-splitter plate 714. A first pulse $I_1$ is reflected by a mirror 719 then sent to the frequency conversion module 718 by means of a deflector plate 717. An attenuator 713 allows the light intensity of the pulse $I_1$ to be adapted according to the nature of the sample 705 that it is desired to machine. A second pulse is stretched in the time domain by means 715 known from the prior art of femtosecond technologies, for example a grating system, a prism or an acousto-optic crystal, in order to form the pulse $I_2$. This pulse is subsequently directed to the frequency conversion module 718 in the same manner.

FIG. 7B illustrates a second example of the time-domain conditioning module 702. In this example, the pulse $I_0$ is divided into two pulses and stretched in the time domain by virtue of an acousto-optic system 721 of the DAZZLER® (produced by FASTLITE®) type. An electronically-controlled shutter 720 allows a pulse to be selected from amongst a train of pulses, when high-pulse-rate laser sources are for example used.

As an alternative to the devices $70_A$ and $70_B$ shown in FIGS. 7A and 7B, two separate synchronized laser sources may be used. The two pulses have spectral bands included within the band of transparency of the material to be machined. In this case, it is not necessary to use a time-stretching means for the beam.

According to one variant, the duration and the energy of the second pulse are adjusted so as not to produce any effect if the second pulse alone is applied in the material. In this case, the synchronization of the pulses is a more flexible parameter. The second pulse may be sent before the first pulse. The energy deposited in the material is then proportional to the time difference between the end of the second pulse and the start of the first pulse. In particular, this approach allows the constraints on the precision of the synchronization to be reduced when the duration of the second pulse is long compared with that of the first pulse.

According to one variant, the nano-machining device according to the invention comprises an electronically-controlled shutter allowing one or more pulses to be selected from amongst the train of pulses emitted by the laser(s). The shutter may be mechanical or optical. In the latter case, it could for example be a Pockels cell followed by a polarizer.

Alternatively, the time-domain conditioning comprises the generation of a train of pulses, the first of the pulses, ultra-short, allowing the generation in the sample of the plasma of free charges on the focusing cylinder obtained by multi-photonic absorption by virtue of the focusing module and the subsequent pulses allowing the deposition of the energy. The duration of the first pulse is for example less than 10 ps. The second pulses can be longer or shorter but each of low intensity. Thus, it is possible to use a train of ultra-short second pulses for the deposition of the energy and the generation of the heating of the material by absorption by the free charges of the plasma, typically with a duration of less than 10 ps, for example with a duration of less than the lifetime of the plasma of free charges in the material (i.e. around 100 fs in glass). The pulses are brought closer together, for example the time difference between the pulses is less than 10 ps. The intensity of said pulses is sufficiently low to avoid the beam de-stabilization by a non-linear effect of the Kerr type. On the other hand, the intensity may be sufficient for contributing to the generation of free charges and amplifying the plasma density. The generation of a train of pulses may be obtained by the means described with reference to FIGS. 7A, 7B, notably with a DAZZLER®, or several delay lines. Alternatively, it is also possible to spectrally imprint, for example by means of a DAZZLER®, a phase of the third order, which yields a beam of the Airy type in the time domain, with multiple sub-pulses. According to one variant, the time difference between the first and second pulse is greater than the lifetime of the plasma of free charges in the material but less than the thermal relaxation time.

FIGS. 8 to 10 illustrate various applications of the micro-machining method according to the present description.

FIGS. 8A to 8E illustrate a first application of the method to micro-drilling for the formation of through-holes with diameters larger than or of the order of magnitude of a micron.

Figure 8E:
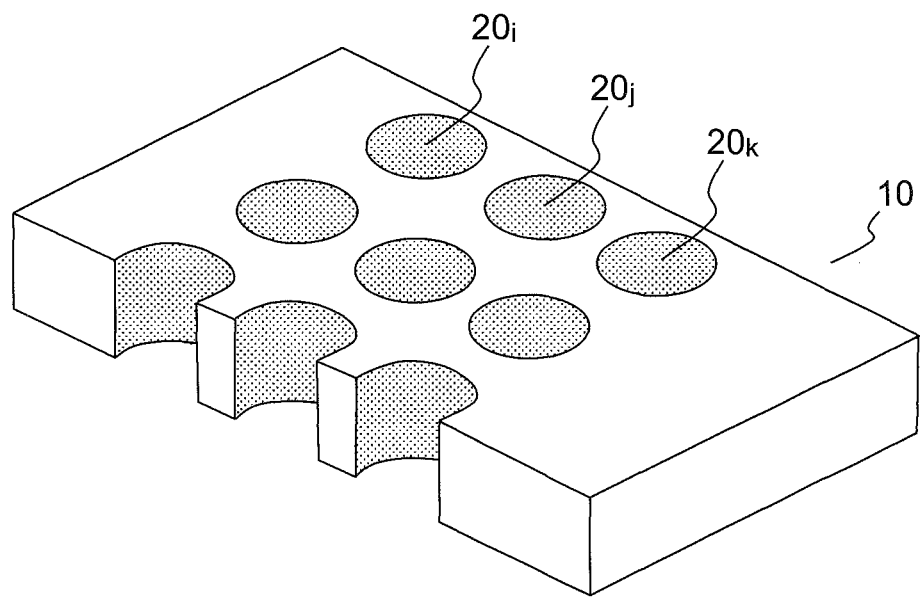
FIGS. 8A to 8E, diagrams illustrating a component to be machined at various steps in the implementation of one variant of the method according to the present description, applied to micro-drilling.
Figure 8A:
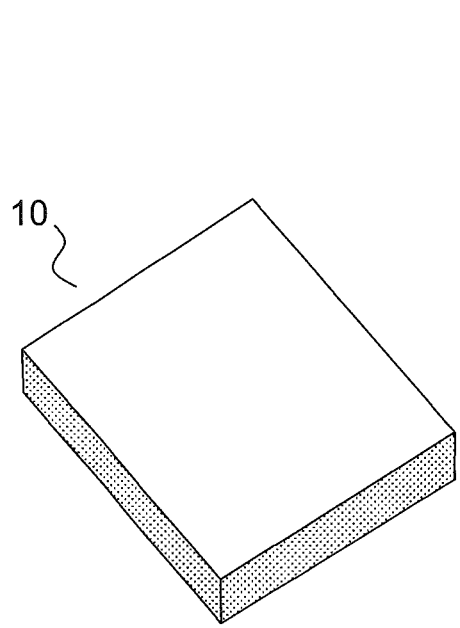

FIG. 8A illustrates the component 10 before the ablation operation. The material from which the sample is formed is for example a glass plate of a few tens of micrometers in thickness and the holes to be formed have for example a diameter of a few microns, or even a few tens of micrometers.

According to one variant, in order to limit the deposition of debris after ablation or in order to allow an adaptation of linear index and/or of non-linear index so as to reduce the deformation of the beam upon crossing the air/glass interface, the component may be "prepared" prior to the drilling operation, for example by deposition on the surface or surfaces of the component to be drilled of a layer of polymer which will be able to be removed after drilling by chemical cleaning.

The drilling operation is preferably carried out in the open air, or, according to one variant, in water or in a liquid medium for either limiting the deposition of debris after ablation or implementing the above-mentioned index adaptation, or else, in multi-pulse ablation mode, for allowing a progressive drilling on the back face.

Figure 8B:
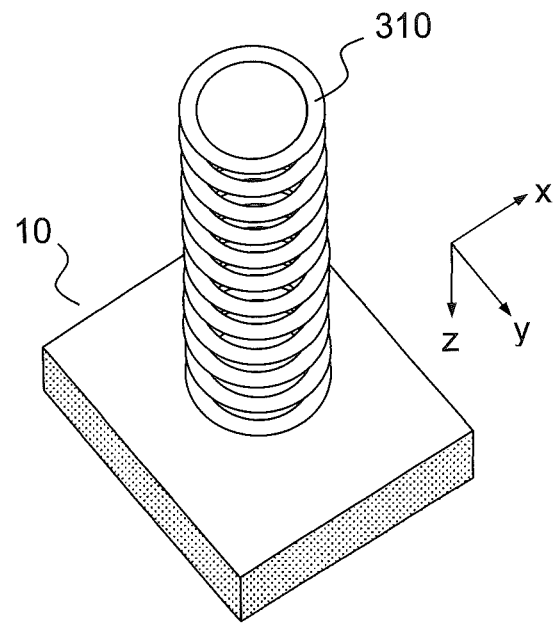

FIG. 8B illustrates the illumination of the sample by one or more pulses, spatially conditioned in order to form, after focusing a non-diffracting beam focused according to a focusing cylinder 310, the light intensity of the pulses being adapted for generating for example the ablation of the material within a volume of the sample situated on the lateral surface of the focusing cylinder.

Figure 8C:
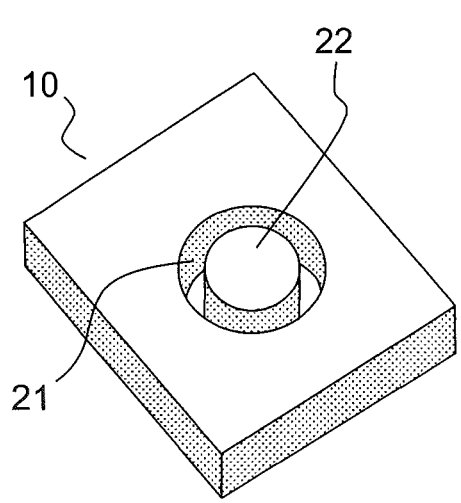

FIG. 8C shows the ablated portion 21 of the material, which has a hollow cylindrical shape. The non-ablated cylinder 22 in the center is still present at the end of the ablation.

Figure 8D:
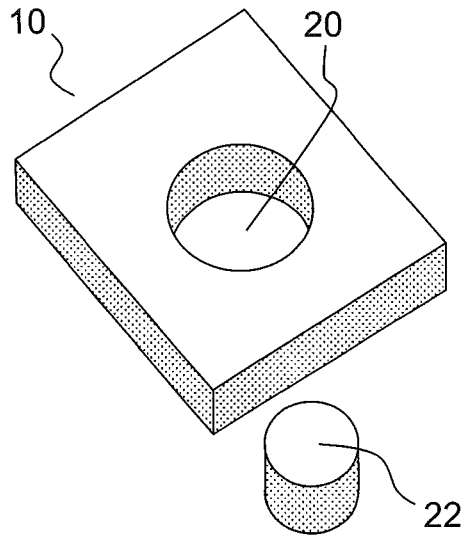

FIG. 8D illustrates the last step of the method, in which the cylinder of material remaining 22 is evacuated, which could be by gravity under its own weight.

The component to be formed is for example illustrated in FIG. 8E and comprises a sample 10 in which several holes 20; of circular cross-section are formed in the material.

It is also possible to evacuate the cylinder 22 using a jet of air or of liquid, or via a de-pressurization exerted on one face of the component to be drilled. Alternatively, it is possible to evacuate the cylinder 22 by means of a cleaning process in an ultrasound bath or using chemical attack, chosen as a function of the material to be ablated. For example, for fused silica or glasses, it may be advantageous to eliminate the cylinder of remaining material 22 by a chemical attack with hydrofluoric acid (HF) or by a chemical attack with potassium hydroxide (KOH), which could be combined with a cleaning process as mentioned in the previous points.

As far as the drilling itself is concerned (FIGS. 8B, 8C), several strategies may be exploited.

Figure 9A:
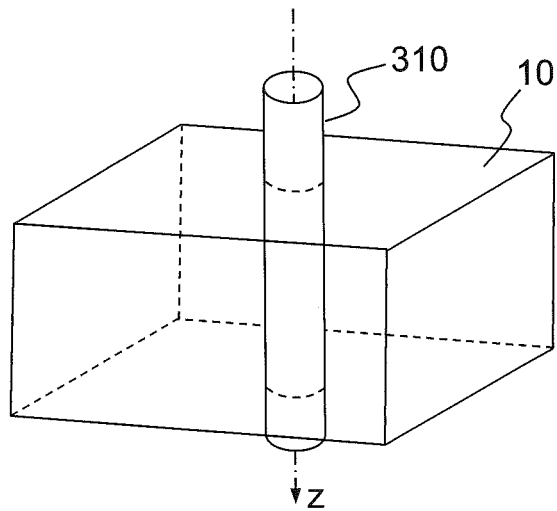
FIGS. 9A to 9C, diagrams illustrating variants of the method according to the present description, applied to micro-drilling into a component with various thicknesses.

According to a first variant illustrated in FIG. 9A, the component to be drilled is placed approximately in the center of the Bessel-Vortex beam, and one or more laser shots are emitted in order to induce damage in the component, either in the form of a single first pulse with sufficient power, or in the form of a train of first pulses, or in the form of a succession of first and second pulses exhibiting different time-domain characteristics, as has been previously described, notably as can be seen in FIGS. 7A, 7B.

In the case of a thick sample, in other words thicker than the diffraction length of the Bessel-Vortex beam, several variants are possible. According to a first example, the component is moved longitudinally along the axis of the focusing cylinder. According to a second example, illustrated by FIGS. 9B and 9C, the component to be drilled can be illuminated by a sequence of laser shots at various longitudinal positions.

Figure 9B:
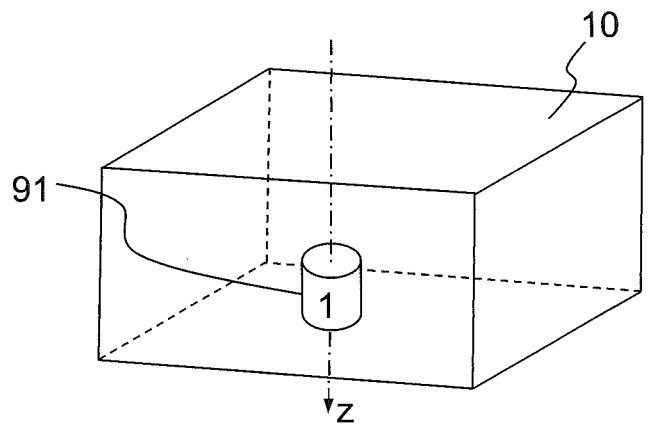
Figure 9C:
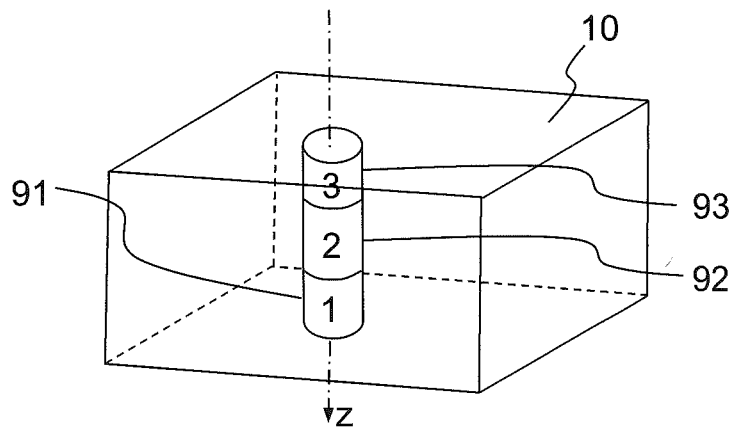

FIG. 9B thus illustrates the generation of a first Bessel-Vortex beam 91 with a longitudinal axis Z and FIG. 9C illustrates the generation of two other beams 92, 93 of the Bessel-Vortex type generated separately, then superposed on the same axis Z with a longitudinal shift. The damage is induced, in this case, with no displacement of the component, and by several laser illuminations coming from these various beams. It should be noted that this second strategy is advantageous because it allows the potential problems due to the difference in damage threshold between the surface and the core of the component to be drilled to be avoided.

Other variants are envisioned for the micro-drilling.

For example, the component to be drilled may advantageously undergo, between two laser shots, one rotation about the axis of the beam, in such a manner as to spread out the damage induced uniformly.

In order to implement several drillings on the same component, it is possible to translate the component between each site or to perform the ablation of several sites at the same time by virtue of a device allowing Bessel-Vortex beams to be generated in parallel. This solution may advantageously be obtained by means of holograms known as 'multiplex holograms'.

Figure 11:
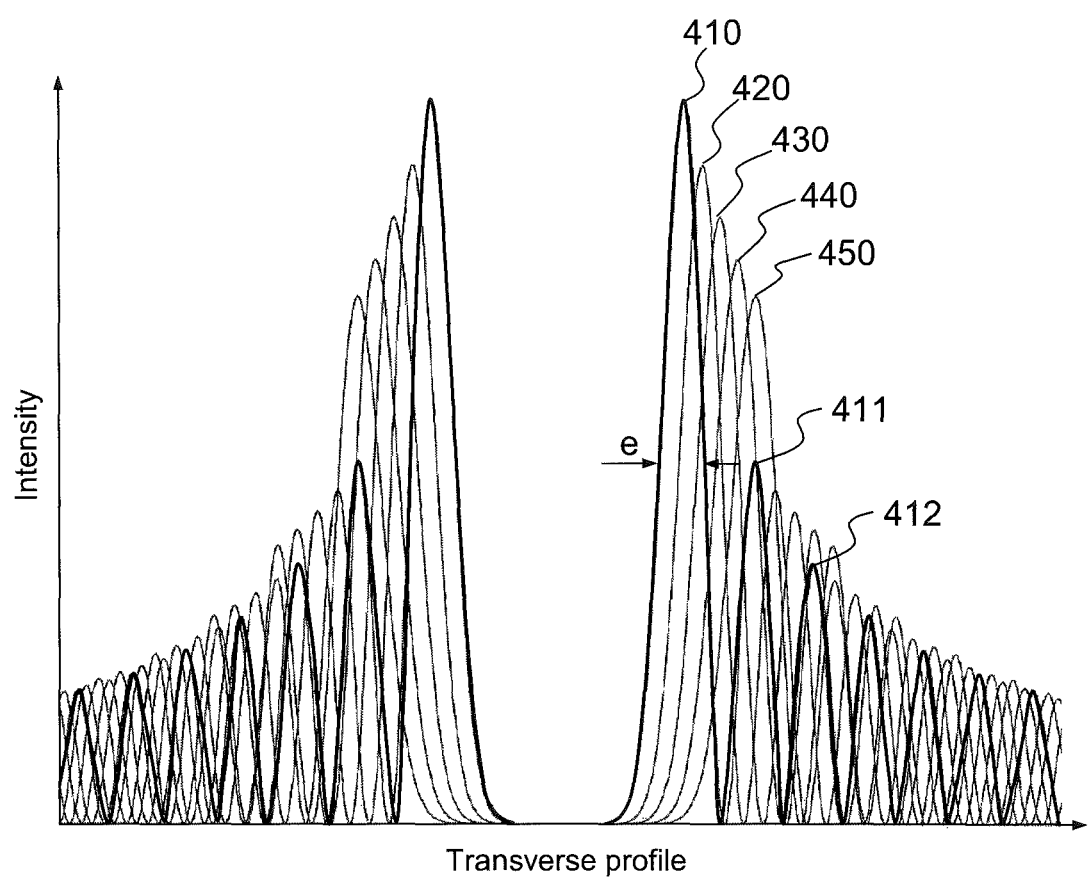
FIG. 11, a diagram illustrating one variant of the method according to the present description, applied to the micro-drilling of holes with large diameters.

For the formation for example of holes with large diameters (typically larger than a few tens of microns), several laser shots may be carried out on the same site of the component to be drilled, but using slightly different parameters for the Bessel-Vortex beams, in order to generate damaged areas on concentric cylinders with different diameters. These beams with different parameters may be formed either with different means for producing the beam or by varying the parameters between each illumination or each sequence of illuminations of several sites. FIG. 11 thus illustrates various intensity profiles for Bessel-Vortex beams having topological charges in the range between 6 and 10 and whose intensity profiles are respectively referenced 410, 420, 430, 440, 450. Advantageously, the ablation is implemented beginning with the beam defining the cylinder of ablation with the smallest radius, then progressively increasing the radius of the cylinder of ablation. The reason for this is that, on the cylinder of ablation, the material becomes opaque or highly diffusing and blocks the propagation of light to a cylinder of smaller radius.

In the case of drilling holes of large diameter, it is also possible to use a "milling" process. In this case, the method comprises for example the displacement of a focusing cylinder around the region to be hollowed out.

Figure 10A:
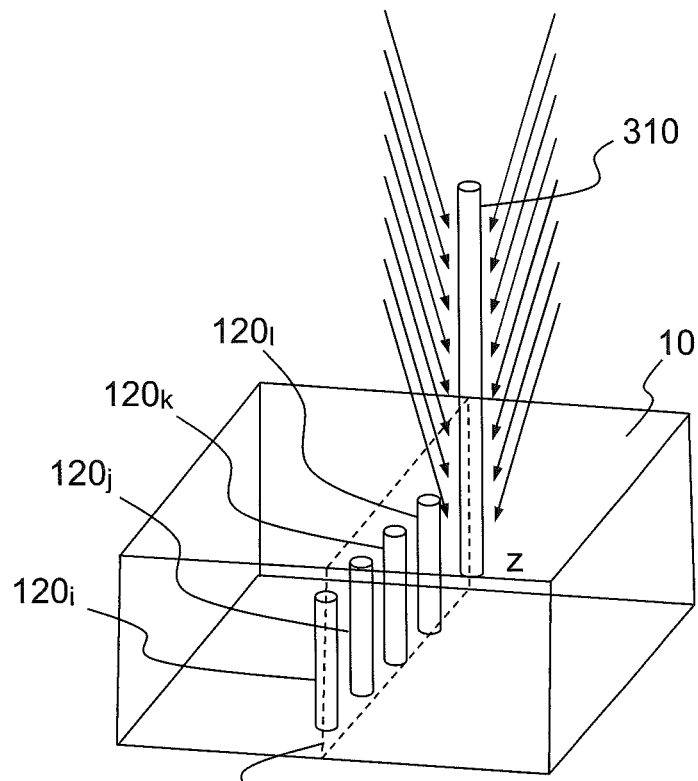
FIGS. 10A and 10B, diagrams illustrating a component to be machined at various steps in the implementation of one variant of the method according to the present description, applied to cleaving.
Figure 10B:
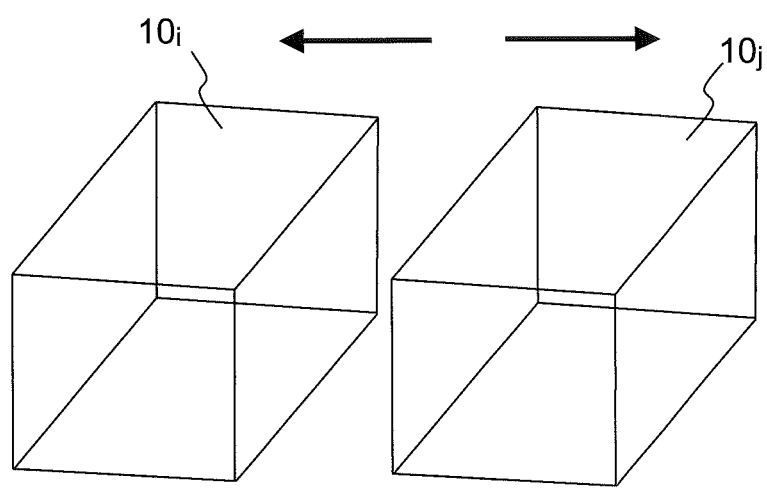

FIGS. 10A and 10B illustrate another application of the method according to the present description for cleaving a sample, for example a plate of dielectric material of the glass plate type or a wafer of semiconductor material.

A sample 10 is illuminated for example by means of a beam of the Bessel-Vortex type 310 such as previously described, and the sample is displaced with respect to the beam in such a manner as to create a modification of the physico-chemical properties of the material within volumes $120_i$, $120_j$, $120_k$, $120_l$, situated on the lateral surface of the focusing cylinder (FIG. 10A). These modifications of the material induce stressed regions on a vertical plane 100, leading to the fragilization of the material and the cleaving on this plane (FIG. 10B). This plane of illumination may advantageously be inclined in order to produce cutouts with beveled edges. Excellent surface qualities can thus be obtained (flatness typically better than lambda/20).

Although described via a certain number of detailed exemplary embodiments, the method and the device for laser micromachining according to the invention comprise various variants, modifications and improvements which will be apparent and obvious to those skilled in the art, it being understood that these various variants, modifications and improvements form part of the scope of the invention, such as defined by the claims that follow.

The invention claimed is:

1. A laser micromachining device for drilling holes in a sample made of a given material, comprising:
    a laser source configured to generate an incident beam comprising at least one light pulse; and
    a spatial conditioning optical system having an optical axis and configured to generate and focus, from the incident beam, a non-diffracting beam of Bessel-Vortex type, the focused non-diffracting beam having a property of maintaining a constant profile along the optical axis, and having a shape of a hollow cylinder of given dimensions oriented along the optical axis, wherein the focused non-diffracting beam is a focusing cylinder wherein the spatial conditioning optical system is configured to adapt a size and a position of the focused non-diffracting beam in the sample, and wherein the laser source is designed to generate, after the focusing in the sample, a plasma of free charges by multi-photonic absorption in a volume of the sample situated on the lateral surface of said focusing cylinder, said plasma generates a hole formation.

2. The device as claimed in claim 1, in which the at least one light pulse has a duration of less than 100 picoseconds.

3. The device as claimed in claim 1, in which said laser source allows the emission of a first light pulse or of a train of first light pulses of given optical power, higher than a first optical power threshold, said first optical power threshold being sufficient for causing a modification of one or more physico-chemical properties of the material at the location of formation of the plasma.

4. The device as claimed in claim 3, in which said optical power is higher than a second optical power threshold sufficient for causing an ablation of the material at the location of formation of the plasma.

5. The device as claimed in claim 1, in which the laser source allows the emission of at least a second electromagnetic wave designed to be spatially superposed at the location of formation of the plasma.

6. The device as claimed in claim 5, in which said laser source comprises a single laser source, and wherein a first and at least a second light pulse are conditioned in a time-domain to be generated starting from a light wave emitted by said laser source.

7. The device as claimed in claim 1, in which the optical system allows a beam to be generated having an annular distribution of an intensity in a space of spatial frequencies and a phase in the space of the spatial frequencies of the type $\Phi(k_r,\theta)=N\theta$, where $(k_r,\theta)$ are the cylindrical coordinates and N is a relative non-zero integer.

8. The device as claimed in claim 1, in which the optical system allows, after focusing in said sample, a plurality of focusing cylinders to be formed simultaneously.

9. The device as claimed in claim 1, wherein the laser source is configured to condition a polarization of light pulses.

10. The device as claimed in claim 1, wherein the focusing cylinder is configured to evacuate the material contained inside the focusing cylinder.

11. A method for drilling holes in a sample made of a material having a given transparency band by laser micromachining, comprising:
    emitting an incident beam comprising at least one light pulse with a spectral band included within the transparency band of said material; and
    spatial conditioning said first pulse for generating, after focusing in said sample, a non-diffracting beam of Bessel-Vortex type, the focused non-diffracting beam having a property of maintaining a constant profile along an optical axis, and having a shape of a hollow cylinder of given dimensions oriented along the optical axis, the focused non-diffracting beam being a focusing cylinder,
    wherein light intensity of said non-diffracting beam allows a plasma of free charges to be generated by multi-photonic absorption within a volume of the sample situated on the lateral surface of said focusing cylinder, said plasma generates a hole formation.

12. The method as claimed in claim 11, further comprising emitting a first light pulse or of a train of light pulses with an optical power sufficient to cause a modification of one or more physico-chemical properties of the material at the location of formation of the plasma.

13. The method as claimed in claim 12, in which said optical power is sufficient for causing an ablation of the material at the location of formation of the plasma.

14. The method as claimed in claim 11, further comprising:
   emitting at least a second electromagnetic wave with a spectral band included within the transparency band of said material, spatially superposed at the location of formation of the plasma so as to generate a heating up of said material by absorption by the free charges of the plasma.

15. The method as claimed in claim 11, applied to the micro-drilling of a sample made of a given material for the formation of at least one through-hole, comprising:
   controlling the diameter of the through-hole by the control of the spatial conditioning parameters of the at least one light pulse; and
   controlling the relative position of the sample and the focused non-diffracting beam.

16. The method as claimed in claim 15, further comprising:
   evacuating the material contained inside the focusing cylinder in order to form said through-hole.

17. The method as claimed in claim 11 applied to the cleaving of a sample, further comprising:
   displacing the focused non-diffracting beam along a cleaving plane.

* * * * *